(12) United States Patent
Matsuura et al.

(10) Patent No.: US 10,965,903 B2
(45) Date of Patent: Mar. 30, 2021

(54) SIGNAL PROXYING AND MODIFICATION PANEL

(71) Applicant: Vivint, Inc., Provo, UT (US)

(72) Inventors: Craig Matsuura, Draper, UT (US); Ryan Carlson, South Jordan, UT (US)

(73) Assignee: Vivint, Inc., Provo, UT (US)

( * ) Notice: Subject to any disclaimer, the term of this patent is extended or adjusted under 35 U.S.C. 154(b) by 419 days.

(21) Appl. No.: 14/636,491

(22) Filed: Mar. 3, 2015

(65) Prior Publication Data

US 2016/0261822 A1 Sep. 8, 2016

(51) Int. Cl.
| | | |
|---|---|---|
| G06F 15/16 | (2006.01) | |
| H04N 7/01 | (2006.01) | |
| H04L 29/06 | (2006.01) | |
| H04N 5/765 | (2006.01) | |

(52) U.S. Cl.
CPC ....... *H04N 7/0117* (2013.01); *H04L 65/4084* (2013.01); *H04L 65/605* (2013.01); *H04N 5/765* (2013.01)

(58) Field of Classification Search
CPC .. H04N 7/0117; H04N 5/765; H04L 65/4084; H04L 65/605
USPC ........................................................ 709/246
See application file for complete search history.

(56) References Cited

U.S. PATENT DOCUMENTS

| | | | |
|---|---|---|---|
| 7,287,094 B2 | 10/2007 | Mogul | |
| 7,505,889 B2 | 3/2009 | Salmonsen et al. | |
| 8,098,281 B1 | 1/2012 | Croak et al. | |
| 8,775,660 B2 | 7/2014 | Anschutz et al. | |
| 8,838,677 B2 | 9/2014 | Persson et al. | |
| 9,495,849 B2 * | 11/2016 | Jentoft | H04N 7/185 |
| 2006/0176369 A1 * | 8/2006 | Meritt | G08B 13/19621 348/143 |
| 2007/0113261 A1 * | 5/2007 | Roman | H04N 7/17318 725/134 |
| 2008/0091845 A1 * | 4/2008 | Mills | H04L 67/2823 709/246 |
| 2011/0103773 A1 * | 5/2011 | Johnson | G08B 13/19608 386/290 |
| 2016/0043866 A1 * | 2/2016 | Nixon | G05B 19/41855 713/168 |
| 2016/0044283 A1 * | 2/2016 | Vourkoutiotis | H04N 7/181 348/143 |
| 2016/0105718 A1 * | 4/2016 | Xu | H04N 21/25841 725/25 |

* cited by examiner

*Primary Examiner* — Umar Cheema
*Assistant Examiner* — Anh Nguyen
(74) *Attorney, Agent, or Firm* — Holland & Hart, LLP

(57) ABSTRACT

Methods and systems for signal proxying and modification relating to security and/or automation systems are described. In one embodiments, the methods include receiving, at a proxy device, a data signal transmitted from a first device, receiving a request for the data signal from at least one of two or more other devices, and transmitting the data signal to each of the two or more other devices based at least in part on the received request.

19 Claims, 11 Drawing Sheets

SIGNAL PROXYING AND MODIFICATION PANEL

BACKGROUND

The present disclosure, for example, relates to security and/or automation systems, and more particularly to proxying and/or modifying signals sent from a first device through an intermediate proxy-related device to other devices.

Security and automation systems are widely deployed to provide various types of communication and functional features such as monitoring, communication, notification, and/or others. These systems may support communication with a user through a communication connection or a system management action.

Current systems employ designated communication or transmission lines from certain devices, including peripheral devices like video cameras. These systems use and require a connection between a sending device and every receiving device. As the number of receiving devices increases and as the number of connections down the line increases, the system requirements and usage—including bandwidth needs—also increases. The similar or duplicative connections between the sending device and the other devices limit the network's performance and diminishes user ability to both on a local network and uploading/downloading.

In addition, current systems do not allow efficient management of the signals transmitted from the sending devices to the receiving devices. With the development of security and/or automation systems, new challenges and problems present themselves, including constant and variable data requirements based on video, voice, and/or other data signals. These problems also include, among others, how to efficiently manage signals based on the receiving devices' capabilities and other system performance limitations.

SUMMARY

The present systems and methods relate to automation and/or security systems. More specifically, the present systems and methods relate to receiving a data signal from a device and transmitting the data signal in one form or another to one or more other devices—based at least in part on at least one received request and/or other information. The present systems and methods may, among other things, reduce network traffic and/or bandwidth usage by eliminating the current need for designated data signal transmissions between multiple devices—particularly where multiple devices may be communicating using the same wireless channel, like a home and/or an office network. The present system and methods may reduce network saturation relating to download and/or receiving speeds as well as upload and/or transmitting speeds. In some embodiments, the received data signal may be a single transmission from a transmitting device. In some embodiments, the received data signal may be modified before, during, and/or after it is transmitted to one or more other devices. This modification may include, among other things, changing one or more characteristics, transcoding, re-encoding, etc.

Methods for security and/or automation systems are disclosed. In some embodiments, these methods may include receiving, at a proxy device, a data signal transmitted from a first device, receiving a request for the data signal from at least one of two or more other devices, and/or transmitting the data signal to each of the two or more other devices based at least in part on the received request.

In some embodiments, the data signal may include a video data signal. In some embodiments, receiving the request may include receiving the request from each of the two or more other devices. In some embodiments, the received data signal may include a single transmission from the first device.

In some embodiments, the two or more other devices may include at least one of a digital video recorder, a smartphone, a laptop, and/or a combination thereof. In some embodiments, the methods may include communicating with the two or more other devices on behalf of the first device.

In some embodiments, the proxy device may include a security system panel. In some embodiments, the data signal may be received from the first device via a wireless connection. In some embodiments, the first device may include a camera that records the data signal.

In some embodiments, the methods may include modifying the data signal before it is transmitted to each of the two or more other devices. In some embodiments, modifying the data signal may include splicing the data signal. In some embodiments, modifying the data signal may include re-encoding the data signal.

In some embodiments, modifying the data signal may include modifying at least one characteristic of at least a portion of the data signal. In some embodiments, modifying the at least one characteristic may include modifying a first resolution of the data signal from the first resolution to a second resolution. In some embodiments, the first resolution is greater than the second resolution. In some embodiments, transmitting the data signal to each of the two or more other devices may include transmitting the data signal having the second resolution.

In some embodiments, transmitting the data signal to each of the two or more other devices may include transmitting the data signal having the first resolution to one of the two or more other devices, and/or transmitting the data signal having the second resolution to another of the two or more other devices.

Apparatuses for security and/or automation systems are also disclosed. In some embodiments, these may include a processor, memory in electronic communication with the processor, and/or instructions stored in the memory, the instructions being executable by the processor. In some embodiments, the instructions may be executable by the processor to receive, at a proxy device, a data signal transmitted from a first device, receive a request for the data signal from at least one of two or more other devices, and/or transmit the data signal to each of the two or more other devices based at least in part on the received request. In some embodiments, the instructions may further be executable by the processor to transcode the data signal before it is transmitted to each of the two or more other devices. In some embodiments, this transcoding may include converting one encoding to another, converting analog-to-analog, converting digital-to-digital, and/or modifying a format and/or a bitrate, etc.

Non-transitory computer-readable mediums storing computer-executable code for security and/or automation systems are also disclosed. In some embodiments, the code may be executable by a processor to receive, at a proxy device, a data signal transmitted from a first device, receive a request for the data signal from at least one of two or more other devices, and/or transmit the data signal to each of the two or more other devices based at least in part on the received request.

The foregoing has outlined rather broadly the features and technical advantages of examples according to this disclosure so that the following detailed description may be better understood. Additional features and advantages will be described below. The conception and specific examples disclosed may be readily utilized as a basis for modifying and/or designing other structures for carrying out the purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, not as a definition of the limits of the claims.

BRIEF DESCRIPTION OF THE DRAWINGS

A further understanding of the nature and advantages of the present disclosure may be realized by reference to the following drawings, which are incorporated into this disclosure. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Current systems use and require transmitting multiple signals from a first device to other devices creating multiple connections. For example, a video camera relating to a structure currently transmits separate video streams to each separate receiving device. Each of these signal transmissions consumes a certain amount of bandwidth and system resources.

The present systems and methods, however, allow devices (like a video camera, as an example) to transmit one signal to a device acting as a proxy. This proxy device or proxy module receives the signal and may transmit the signal in some form to one or more other receiving devices. In addition, the proxy module may modify one or more characteristics of the received data signal (e.g., resolution, quality) and send the original data signal and/or the modified signal in some form to the other receiving devices.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
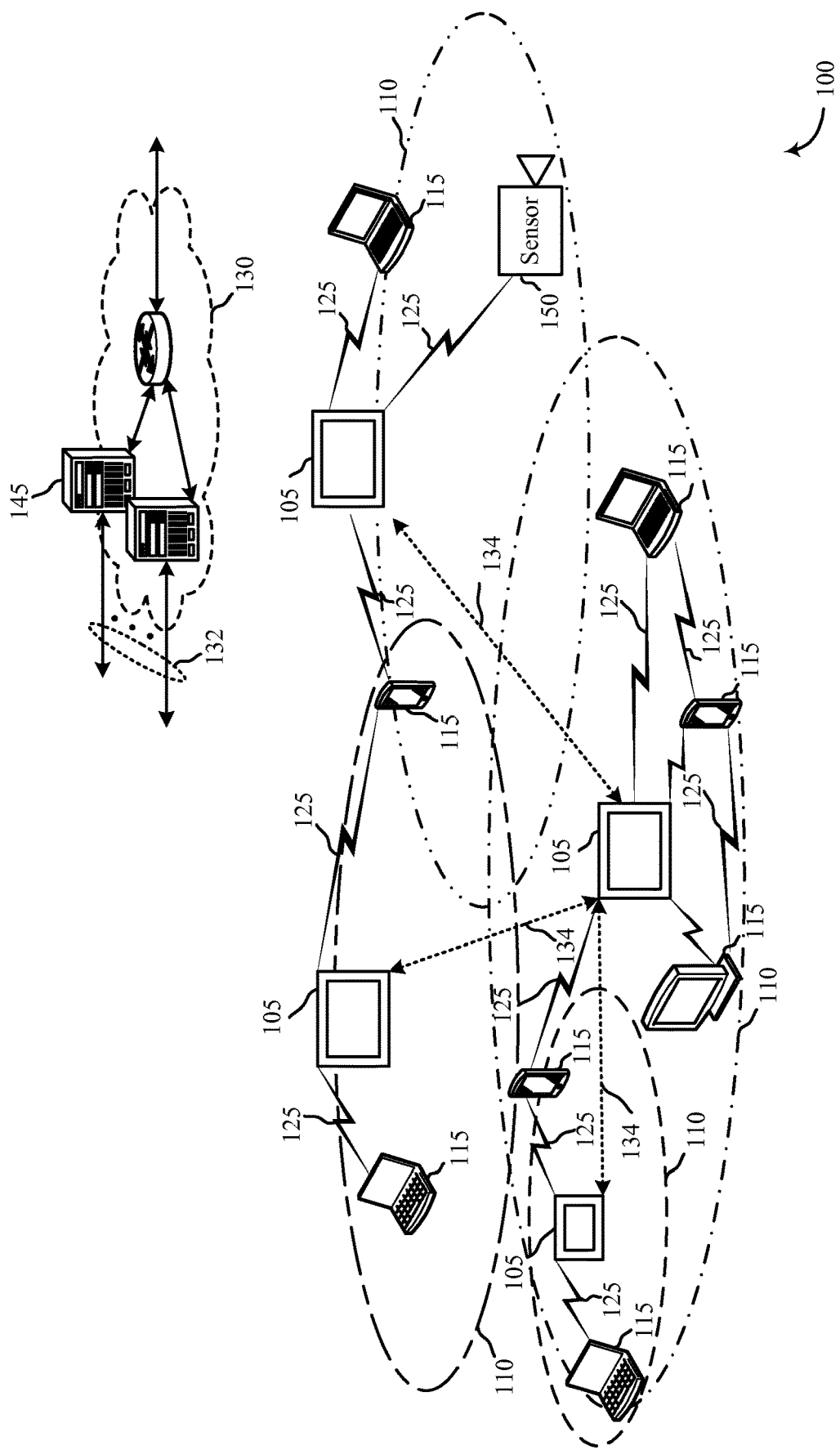
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, a network 130, and/or sensors 150. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communicate with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless direct communication links 134. Control panels 105 may communicate with a back end server (such as the remote server 145)—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The control panels 105 may communicate with the devices 115 via a wired connection.

The communications system 100 may include control panels 105 of different types. In some embodiments, the communications system 100 may include multiple control panels and each may be associated with the same and/or different structures, where each control panel 105 may relate to and/or communicate with others. For example, a home may incorporate a primary control panel 105 and an alternate control panel 105 each located in and/or near the home. Alternatively, one structure may incorporate a primary control panel 105 and another structure may incorporate an alternate control panel 105. The alternate control panel may include some, most, or all of the features of the primary control panel and vice versa. In this disclosure any discussion of a control panel applies with equal force to an alternate control panel unless otherwise stated.

There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one or more discrete structures may be related to one or more discrete areas. In other examples, multiple control panels 105 may be related to the same one or more discrete structures (e.g., multiple control panels relating to a home, a neighborhood, and/or a business complex).

The devices 115 may be dispersed throughout the communications system 100 and each device 115 may be stationary or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, a digital video recorder (DVR), and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary or mobile. A sensor 150 may include and/or be one or more sensors that sense: proximity, motion, temperatures, humidity, sound level, smoke, structural features (e.g., glass breaking, window position, door position), time, light geo-location data of a user and/or a device, distance, biometrics, weight, speed, height, size, preferences, light, darkness, weather, time, system performance, images, video, and/or other inputs that relate to a security and/or an automation system. A device 115 and/or a sensor 150 may be able to communicate through one or more wired and/or wireless connections with various components such as control panels, base stations, and/or network equipment (e.g., servers, wireless communication points, etc.), and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices (115 or otherwise) via one or more direct communication links 125. Two or more devices 115 may communicate via a direct communication link 125 when both devices 115 are in the geographic coverage area 110 or when one or neither devices 115 is within the geographic coverage area 110. Examples of direct communication links 125 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, one or more devices 115 may include a camera and/or a signal-transmitting device. As an example, camera device 115 may communicate, directly and/or indirectly, with one or more control panels 105 of a system. In some embodiments, camera device 115 may continuously, periodically, and/or intermittently transmit one or more data signals to one or more control panels 105 and/or one or more other devices. The one or more control panels 105 (or one or more other devices) may receive the data signal and perform some operation on the data signal and/or a copy of the data signal. These operations may include storing, modifying, compressing, altering, enhancing, and/or inserting at least a portion of the signal, among other things. The one or more control panels 105 may transmit the original data signal and/or one or more other signals (including variations of the original data signal) to one or more other devices 115.

Figure 2:
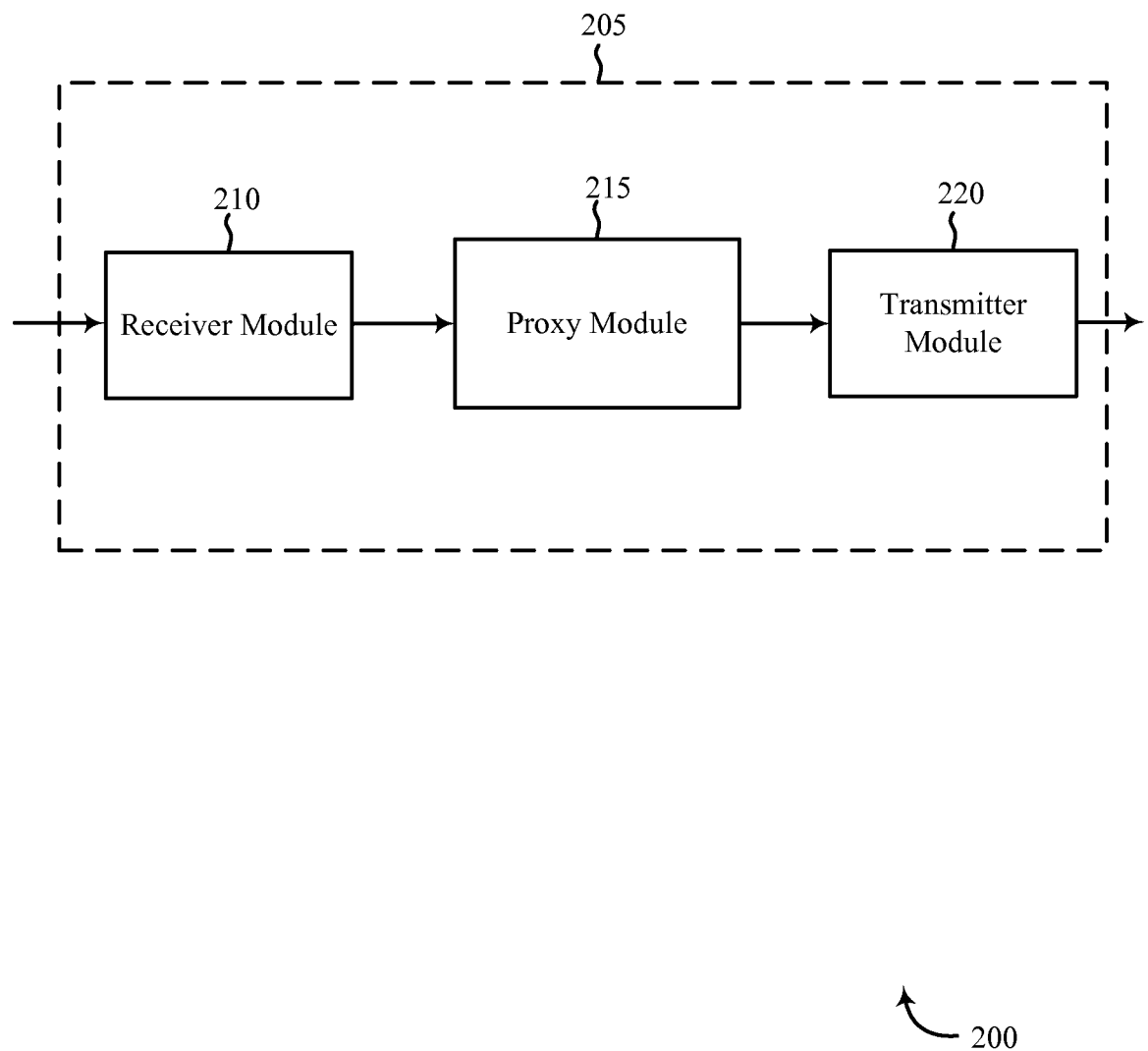
FIG. 2 shows a block diagram of a device relating to a security and/or an automation system, in accordance with various aspects of this disclosure.

FIG. 2 shows a block diagram 200 of a control panel 205 for use in electronic communication, in accordance with various aspects of this disclosure. The control panel 205 may be an example of one or more aspects of a control panel 105 described with reference to FIG. 1, among others. The control panel 205 may include a receiver module 210, a proxy module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may receive different types of data signals, including but not limited to video, voice, music, images, picture, text, and/or other data. Information may be passed on to the proxy module 215, and/or to other components of the control panel 205—directly and/or indirectly.

The proxy module 215 may receive information from the receiver module 210 via one or more communication links. The proxy module 215 may receive the same and/or different types of data signals as the receiver module 210. In some embodiments, the proxy module 215 may receive information from sources other than the receiver module 210. For example, the proxy module 215 may receive information, including but not limited to one or more data signals, from devices 115 and/or a remote server 145, among others.

In some embodiments, proxy module 215 may be included as part of one or more control panels 205. In other embodiments, proxy module 215 may not be included as part of one or more control panels 205 and may be included within and/or linked to one or more other devices, including but not limited to devices 115. In some embodiments, proxy module 215 may be separate from, but related to, one or more control panels 205. In some embodiments, the proxy module 215 may be included in and/or related to a proxy device. This proxy device may include, in some embodiments, a control panel, a doorbell camera housing, a remote server, and/or other devices. In some embodiments, a real-time proxy server (RTSP) may be used, while in other embodiments other types of proxy devices and/or servers may be used.

Based on one or more data signals, proxy module 215 may perform one or more operations related to at least some of the one or more data signals. As one example, proxy module 215 may modify a first data signal. Proxy module 215 may also annotate, track, modify, and/or duplicate one or more of the data signals, among other things. In some embodiments, proxy module 215 may perform one or more operations on one or more sets of data signals and one or more operations (different and/or similar) on one or more other sets of data signals.

The transmitter module 220 may transmit the one or more signals received from other components of the control panel 205. The transmitter module 220 may transmit one or more data signals, portions of data signals, notifications, updates, requests, and/or other information to one or more components and/or elements in a system, such as communications system 100. In some examples, the transmitter module 220 may be collocated with the receiver module 210 in a transceiver module.

Figure 3:
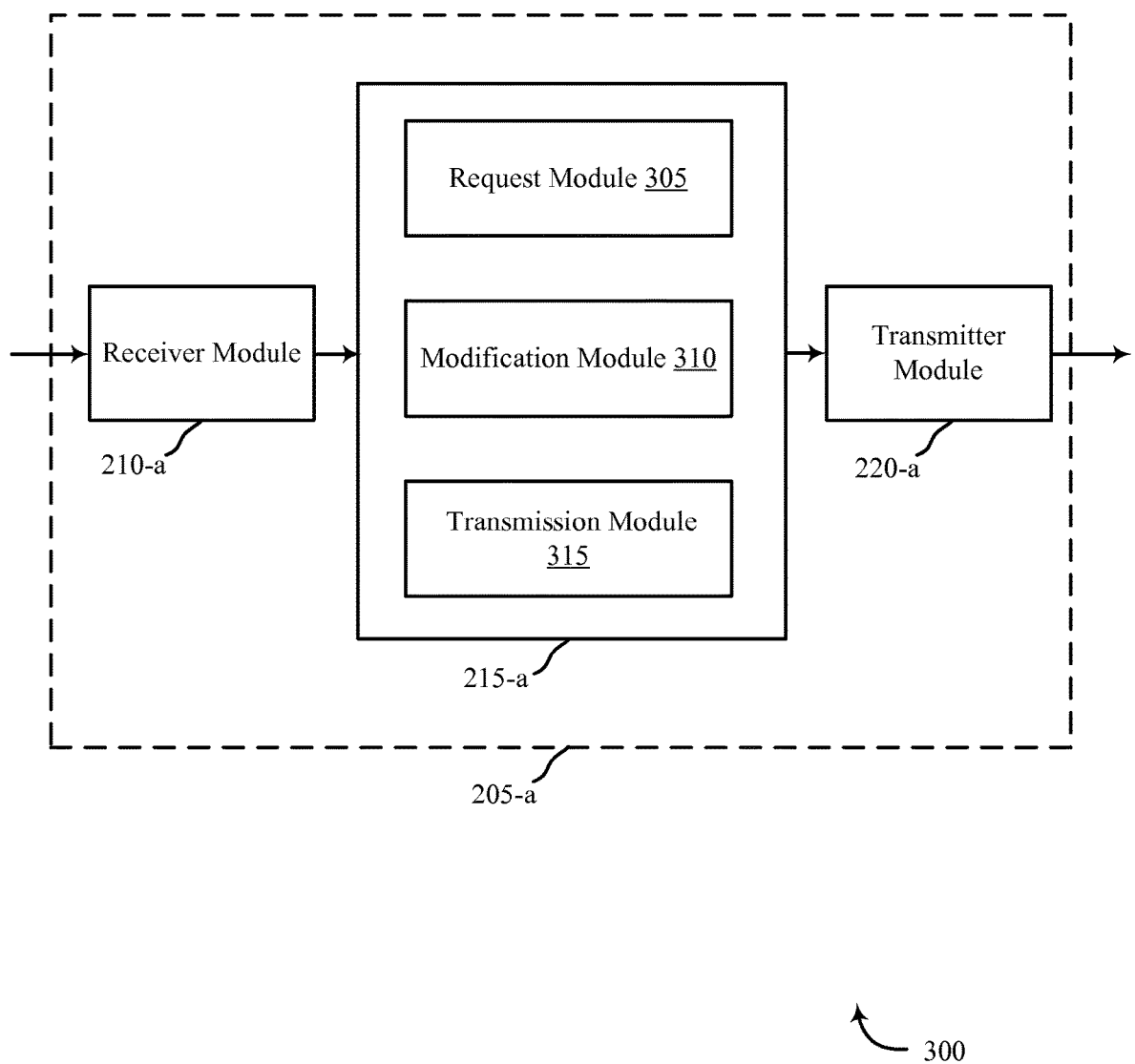
FIG. 3 shows a block diagram of a device relating to a security and/or an automation system, in accordance with various aspects of this disclosure.

FIG. 3 shows a block diagram 300 of an example control panel 205-a, in accordance with various examples. The control panel 205-a may be an example of one or more aspects of a control panel 105 described with reference to FIG. 1 and others in this disclosure. It may also be an example of a control panel 205 described with reference to FIG. 2. The control panel 205-a may include a receiver module 210-a, a proxy module 215-a, and/or a transmitter module 220-a (among others), which may each be examples of the corresponding modules of control panel 205 in FIG. 2. The control panel 205-a may also include a processor. Each of these components may be in communication with each other and/or other components and/or elements of a related system. The proxy module 215-a may include a request module 305, a modification module 310, and/or a transmission module 315. The receiver module 210-a and the transmitter module 220-a may perform the functions of the receiver module 210 and the transmitter module 220, of FIG. 2, respectively. Alternatively, the receiver module 210-a and the transmitter module 220-a may perform different functions than the functions of the receiver module 210 and the transmitter module 220, of FIG. 2, respectively. And, example control panel 205-a may also be for use in wired communication, in accordance with various examples.

In some embodiments, proxy module 215-a may include a request module 305. This request module 305 may receive, generate, annotate, process, analyze, and/or perform other operations related to one or more request. In some embodiments, request module 305 may receive a request from one or more other devices 115, other modules related to control panel 205-a and/or proxy module 215-a, and/or others components and/or elements. Based at least in part on receiving the one or more requests, the request module may generate one or more instructions, notifications, requests, and/or other information, perform one or more transmissions, and/or other operations. For example, request module 305 may receive a request from a device 115. Request module 305 may generate an instruction to another device 115 based at least in part on the received request.

In some embodiments, request module 305 may generate a request, a notification, and/or an instruction independent of other received requests or the absence thereof. As one example, request module 305 may generate a request for information to be transmitted to second device 115. This request may be transmitted to second device 115 based on one or more parameters, which may or may not be independent and/or unrelated to second device 115. For example, request module 305 may generate a request to be sent to a second device 115 based on receiving a first data signal received from first device 115.

Request module 305 may also receive, generate and/or perform other operations related to a notification, an update, and/or an instruction, among other things. In some embodiments, request module 305 may generate, produce, and/or transfer a notification, an update, and/or an instruction to one or more modules related to proxy module 215-a, one or more modules related to control panel 205-a, and/or one or more other modules, elements, and/or components in a system (such as communications system 100). Request module 305 may generate an instruction to modification module 310 and/or transmission module 315 to perform one or more operations, such as transmitting one or more data signals. Request module 305 may also generate an instruction to receiver module 210-a and/or transmitter module 220-a to perform one or more operations.

In some embodiments, proxy module 215-a may include a modification module 310. This modification module 310 may modify, transform, annotate, track, re-encode, and/or duplicate at least one portion of a data signal. In some embodiments, modification module 310 may receive a data signal and modify the received data signal. In some embodiments, modification module 310 may receive a first data signal, create a second data signal, and/or modify at least one of the first data signal and the second data signal. In some embodiments, modification module 310 may receive a first data signal, duplicate and/or store the first data signal (as a second data signal or as a modified variant of the first data signal), and/or modify at least one of the first data signal and the second data signal.

In some embodiments, modifying may include modifying one or more characteristics of at least one or more portions of one or more data signals. Characteristics that can be modified, include but are not limited to: resolution, quality, color, temporal length, size (overall and/or as viewed by a user), whether one or more signals are combined and/or separate, conversion, conversion from one file type to another, compression, image scaling, bitrate, etc. For example, modification module 310 may modify one or more data signals by modifying the resolution from a first resolution to a second resolution, where the second resolution may be greater than, greater than or equal to, less than or equal to, and/or less than the first resolution. Modification module may perform one or more modifications on one or more data signals in series, in parallel, simultaneously, periodically, and/or continuously (for a period of time and/or indefinitely).

In some embodiments, modification module 310 may communicate with request module 305 and/or transmission module 315, among others. In some embodiments, modification module 310 may communicate with receiver module 210-a and/or transmitter module 220-a, among others. Modification module 310 may communicate with other elements and/or components of a system, such as communications system 100.

In some embodiments, proxy module 215-a may include a transmission module 315. This transmission module 315 may receive and/or transmit certain information to one or more modules, elements, and/or components. In some embodiments, transmission module 315 may perform similar functions and/or have similar characteristics as transmitter modules 220 and 220 of FIGS. 2 and 3.

In some embodiments, transmission module 315 may transmit information received by at least one of request module 305 and modification module 310. For example, transmission module 315 may transmit a modified data signal to a component of a system, such as communications system 100. In some embodiments, transmission module 315 may transmit information to another module and/or element of control panel 205-a (i.e., receiver module 210-a, transmitter module 220-a, etc.). For example, in some embodiments, transmission module 315 may transmit to and/or receive information from a user interface, which may include a display. In some embodiments, transmission module 315 may transmit information directly and/or indirectly to an alternate control panel 205.

Alternatively, in some embodiments, transmission module 315 may transmit information to transmitter module 220-a, which then may transmit information (e.g., a data signal) to other elements and/or components outside of control panel 205-a. In some example embodiments, the transmission module 315 may transmit certain information to some elements and the transmitter module 220-a may transmit certain information (that may be the same, partially the same, and/or different from the information transmitted by the transmission module 315) to the same and/or different modules, elements, and/or components. In some embodiments, the transmission module 315 may transmit information to a user interface (e.g., user interface 425 in FIG. 4) while the transmitter module 220-a may transmit the same or different information to other devices (e.g., devices 115, control panels 105 and/or 205, devices within a geographic coverage area 110, and/or variations, among others).

Figure 4:
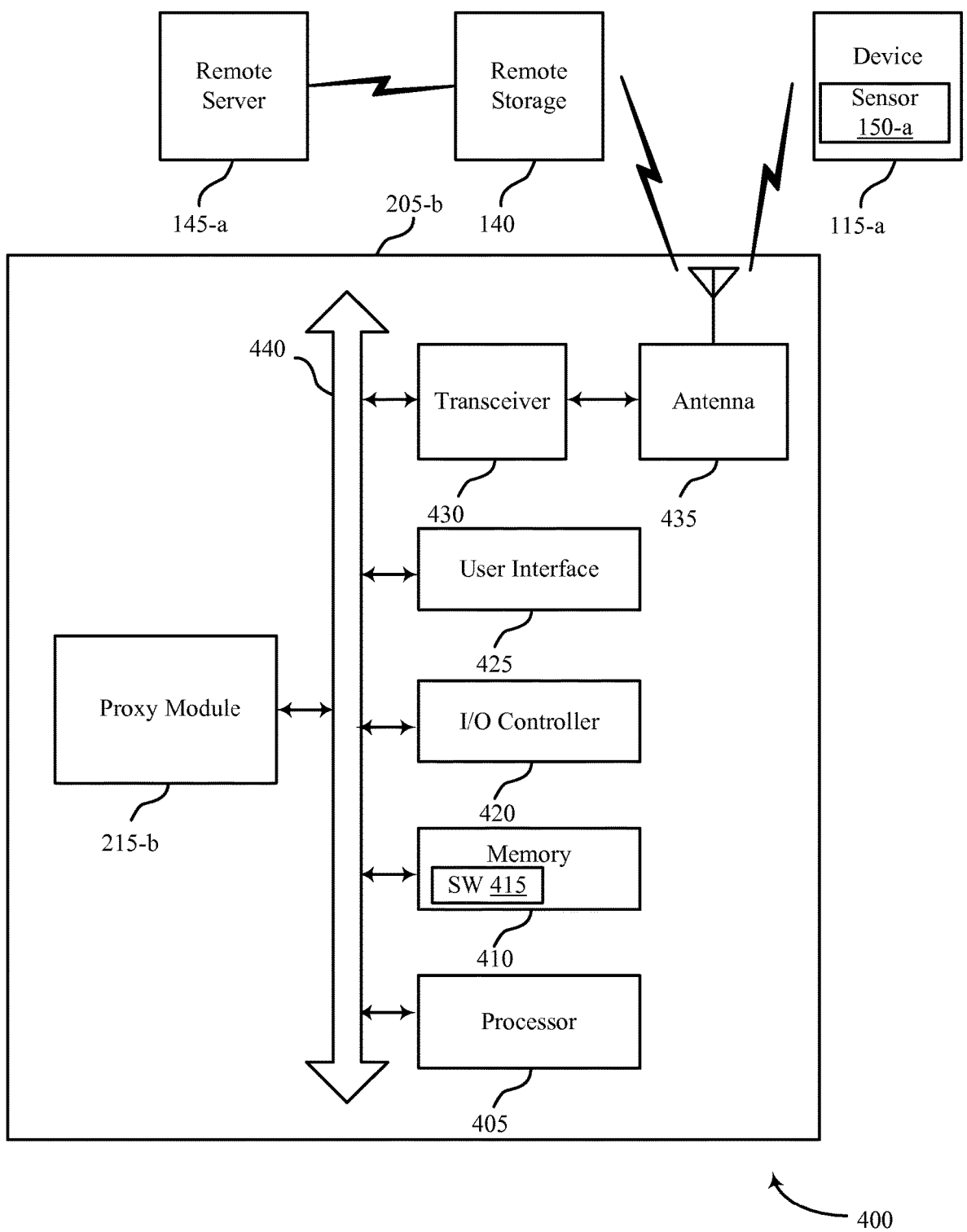
FIG. 4 shows a block diagram relating to a security and/or an automation system, in accordance with various aspects of this disclosure.

FIG. 4 shows a system 400 for use in signal proxying and/or modifying systems, in accordance with various examples discussed in this disclosure. System 400 may include a control panel 205-b, which may be an example of the control panels 105 of FIG. 1. Control panel 205-b may also be an example of one or more aspects of control panels 205 and/or 205-a of FIGS. 2 and 3.

The control panel 205-b may include a proxy module 215-b, which may perform the same, similar and/or different functions than those described above for the proxy modules 215 and 215-a of control panels 205 and 205-a of FIGS. 2 and 3. In some embodiments, the term a control panel and a control device are used synonymously.

Control panel 205-b may also include components for bi-directional voice and data communications including components for transmitting communications and components for receiving communications. For example, control panel 205-b may communicate bi-directionally with one or more of device 115-a, one or more sensors 150-a, remote storage 140, and/or remote server 145-a, which may be an example of the remote server 145 of FIG. 1. This bi-directional communication may be direct (e.g., control panel 205-b communicating directly with remote storage 140) or indirect (e.g., control panel 205-b communicating indirectly with remote server 145-a through remote storage 140).

Control panel 205-b may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices. For example, the transceiver module 430 may communicate bi-directionally with one or more of device 115-a, remote storage 140, and/or remote server 145-a. The transceiver module 430 may include a modem to modulate the packets and provide the modulated packets to the one or more antennas 435 for transmission, and to demodulate packets received from the one or more antenna 435. While a control panel or a control device (e.g., 205-b) may include a single antenna 435, the control panel may also have multiple antennas 435 capable of concurrently transmitting or receiving multiple wired and/or wireless transmissions. In some embodiments, one element of control panel 205-b (e.g., one or more antennas 435, transceiver module 430, etc.) may provide a direct connection to a remote server 145-a via a direct network link to the Internet via a POP (point of presence). In some embodiments, one element of control panel 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-a (e.g., motion, proximity, smoke, light, glass break, door, window, carbon monoxide, and/or another sensor) may connect to one or more elements and/or components of system 400 via a network using one or more wired and/or wireless connections. These one or more sensors 150 may communicate with and/or link to one or more other devices, such as devices 115 and/or control panels 105. For example a sensor 150-a may sense certain information such as a video and/or an image and communicate this information automatically and/or based on one or more parameters to a device such as a control panel 205-b.

In some embodiments, the user interface module 425 may include an audio device, such as an external speaker system, an external display device such as a display screen, and/or an input device (e.g., remote control device interfaced with the user interface module 425 directly and/or through I/O controller module 420). In some embodiments, the user interface module 425 may communicate—directly and/or indirectly—with one or elements of control panel 205-b and/or other devices (e.g., remote server 145-a, remote storage 140, and/or device 115, among others). For example, user interface 425 may communicate with a transmission module 315 and/or transmitter module 220-a relating to proxy module 215-a and/or 215-b.

One or more buses 440 may allow data communication between one or more elements of control panel 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receiving one or more data signals transmitted by one or more devices, receiving and/or generating a request to transmit the data signal to one or more device, modifying one or more data signals, transmitting the data signal potentially based at least in part on the received request, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

The memory 410 can contain, among other things, the Basic Input-Output system (BIOS) which may control basic hardware and/or software operation such as the interaction with peripheral components or devices. For example, the proxy module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem to modulate the packets and provide the modulated packets to the antennas 435 for transmission and/or to demodulate packets received from the antennas 435. While the devices 115-a may include a single antenna, the devices 115-a may have multiple antennas capable of concurrently transmitting and/or receiving multiple wireless transmissions. In some embodiments, the one or more antennas of devices 115-a may transmit to and/or receive information from the antennas 435.

Figure 5:
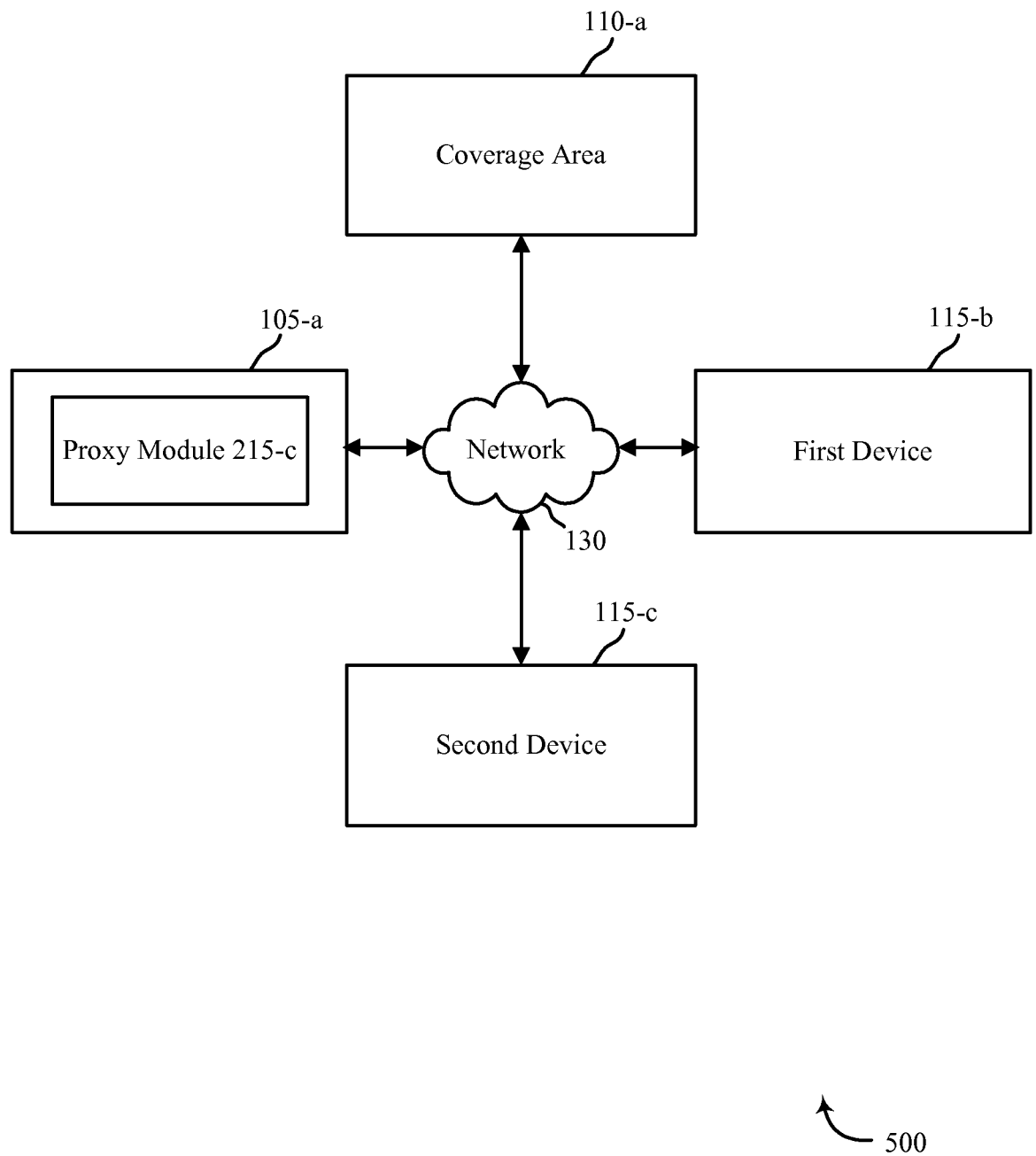
FIG. 5 shows a block diagram relating to a security and/or an automation system, in accordance with various aspects of this disclosure.

FIG. 5 illustrates an example of a communications system 500 in accordance with various aspects of the disclosure. The communications system 500 may include control panel 105-a, coverage area 110-a, first device 115-b, and/or second device 115-c. In some embodiments, one or more components of communications system 500 may communicate via one or more direct and/or indirect communication links. In some embodiments, one or more components may communicate with another using a network, as shown in FIG. 5. In other embodiments, one or more components may communicate directly via a wired and/or a wireless connection. This direct communication may or may not include communicating via a network and/or a remote server.

In some embodiments, control panel 105-a may include a proxy module 215-c, among other things. In some embodiments, proxy module 215-c may receive information from and/or transmit it to one or more other components, such as first device 115-b. Based at least in part on the received information, the proxy module 215-c and/or another element of control panel 105-a may transmit certain information to one or more components of communications system 500, such as second device 115-b. Examples of this information (received and/or transmitted relating to the proxy module 215-b) may include information related to one or more systems, data signals, requests, modifications, communications, and/or notifications, among other things.

In some embodiments, components in communications system 500 may communicate using similar, different, the same, and/or other variations of different communication and/or signal types.

For example, in some embodiments, first device 115-*b* may communicate with control panel 105-*a* via one type of signal (e.g., Bluetooth, WiFi, etc.), while control panel 105-*a* and second device 115-*c* (or devices contained within coverage area 110-*a*) may communicate via another type of signal (e.g., Z Wave, wired connection, etc.). In some embodiments, communication between one or more components may require authentication, encryption, and/or decryption. In some embodiments, one or more components of communications system 500 may include short range wireless communication protocol devices.

In some embodiments, control panel 105-*a* and/or proxy module 215-*c* may communicate with multiple components of communications system 500. For example, control panel 105-*a* may receive one or more data signals from first device 115-*b*, perform one or more operations related to the received one or more data signals and/or other data signals, and/or transmit information related to the one or more data signals to at least one, if not both, of second device 115-*c* and at least one device (e.g., 115) in coverage area 110-*a*.

In some embodiments, communications system 500 or others like it may also use components discussed and/or relating to other systems. For example, communications system 500 components (like first device 115-*b* and control panel 105-*a*) may be in communication with a remote server 145. This remote server 145 may perform at least some operations relating to the communication between the communications system 500 components. In some embodiments, these other elements like remote server 145 may communicate with one or more components of communications system 500 via a network. Alternatively, one or more components shown and/or operations described in relation to FIG. 5 may be performed by a remote server. For example, proxy module 215-*c* may be a proxy server where the control panel 105-*a* may communicate with the proxy module 215-*c*.

Figure 6:
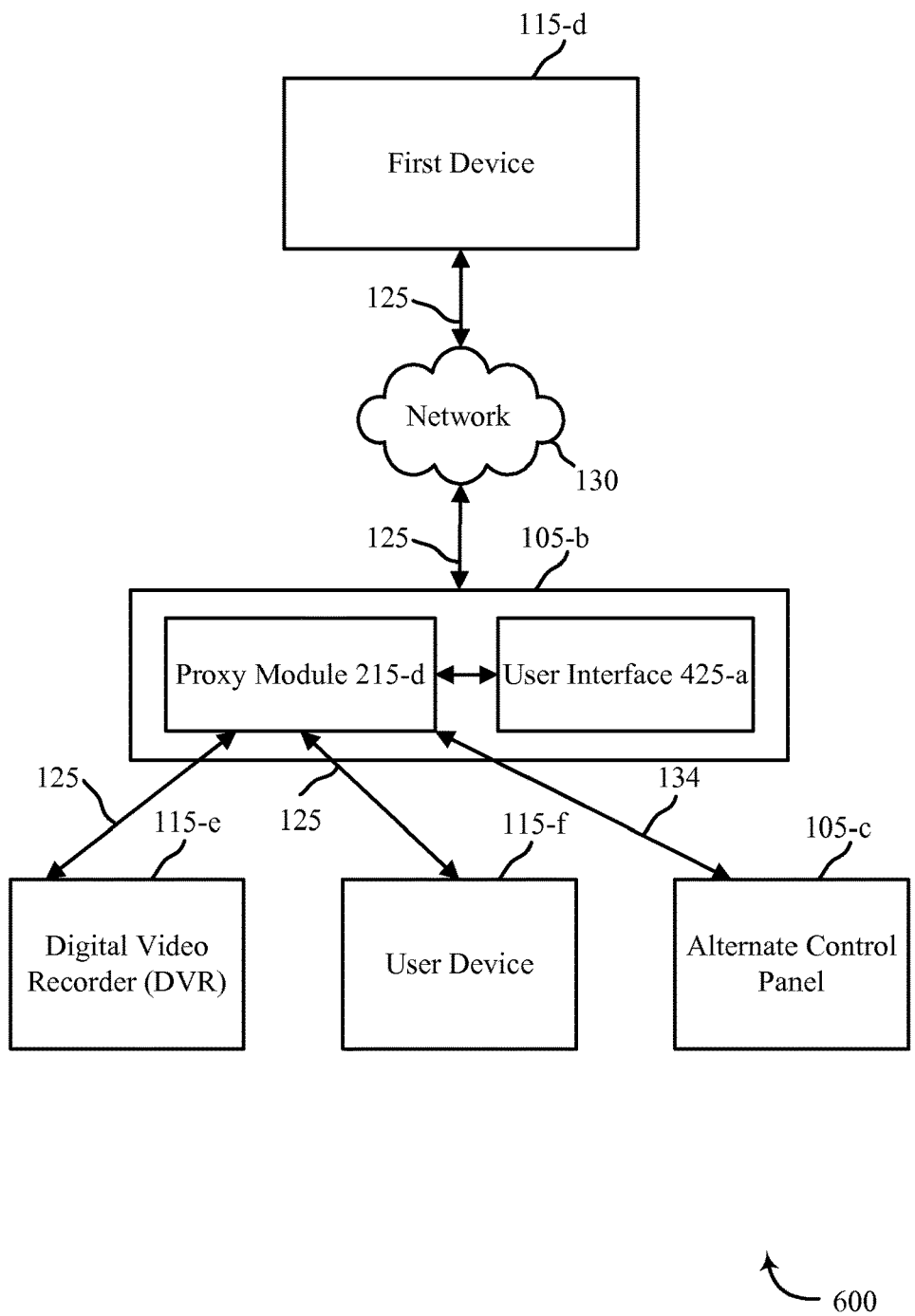
FIG. 6 shows a block diagram relating to a security and/or an automation system, in accordance with various aspects of this disclosure.

FIG. 6 shows a communications system 600 for use in signal proxying and/or modifying systems, in accordance with various examples discussed in this disclosure. Communications system 600 may include one or more of first device 115-*d*, communications links 125 and/or 134, network 130, control panel 105-*b*, digital video recorder 115-*e*, user device 115-*f*, and/or alternate control panel 105-*c*, among other components and/or elements.

In some embodiments, each component of communications system 600 may be in communication with one or more other components of the system via communications links 125. Alternatively, each component of communications system 600 may be in communication with each other component of the system. In some embodiments, each component may be in wired and/or wireless communication with one or more other components. In some embodiments, one or more components may communicate with one or more other components via network 130.

In some embodiments, first device 115-*d* may be an example of other first devices (or other devices) of FIG. 1. First device 115-*d* may also be an example of one or more aspects of first devices 115-*b* of FIG. 5.

In some embodiments, first device 115-*d* may be or include a camera, among other things. First device 115-*d* may capture, generate, and/or record one or more still images and/or videos.

In some embodiments, first device 115-*d* may capture, detect, receive, one or more data signals intermittently, continuously, based on a recurring schedule, based on one or more inputs, automatically, etc. . . .

In some embodiments, first device 115-*d* may transmit one or more data signals to one or more other components of communications system 600. In some embodiments, first device 115-*d* may transmit one or more data signals via a network 130. In some embodiments, first device 115-*d* may transmit one or more data signals to control panel 105-*b*. Control panel 105-*b* may be an example of the control panels 105 of FIG. 1. Control panel 105-*b* may also be an example of one or more aspects of control panels 205, 205-*a*, 205-*b*, and/or 105-*a* of FIGS. 2, 3, 4, and 5, respectively.

In some embodiments, control panel 105-*b* may include one or more elements, including but not limited to proxy module 215-*d* and/or user interface 425-*a*. Proxy module 215-*d* may be an example of the proxy module 215 of FIG. 2. Proxy module 215-*d* may also be an example of one or more aspects of proxy module 215-*a*, 215-*b*, and/or 215-*c* of FIGS. 3, 4, and 5, respectively. User interface 425-*a* may be an example of the user interface 425 of FIG. 4 and/or others discussed in this disclosure.

In some embodiments, control panel 105-*b* may include multiple elements, which be related to and/or may themselves include hardware and/or software components. In some embodiments, the components and/or the elements relating to control panel 105-*b* may be included in a singular housing. Alternatively, one or more components and/or the elements relating to control panel 105-*b* may not be included in a singular housing, but in separate discreet housings that may be within, on, and/or related to one structure. Or, one or more components and/or the elements relating to control panel 105-*b* may be remote from each other.

In some embodiments, communications system 600 or others like it may also use components discussed and/or relating to other systems. For example, communications system 600 components (like first device 115-*d* and control panel 105-*b*) may communicate with one or more remote servers 145. This remote server 145 may perform at least some operations relating to the communication between the communications system 500 components and/or elements, such as elements of control panel 105-*b*. In some embodiments, these other elements like remote server 145 may communicate with one or more components of communications system 600 via a network, including a wired and/or a wireless network.

In some embodiments, one or more elements of communications system 600 may be, be contained within, communicate with, and/or have at least some operations described in this disclosure performed at a remote server (e.g., 145). For example, proxy module 215-*d* may be separate from user interface 425-*a* and proxy module 215-*d* may be at a remote location and may be a remote server, such as a proxy server. In some embodiments, one or more requests received by proxy module 215-*d* and a proxy server may transmit and/or provide one or more data signals to the one or more requesting devices (e.g., digital video recorder 115-*e*, user device 115-*f*, alternate control panel 105-*c*, etc.). In some embodiments, the transmitted information may include a web address/URL that may facilitate and/or enable the one or more requesting devices to receive one or more data signals transmitted by the proxy module 215-*d* and/or control panel 105-*b*, including but not limited to data signals received by the control panel 105-*b* from one or more first devices 115-*d*. Or, in some alternatives, proxy module 215-*d* may be separate from user interface 425-*a*, but may be positioned locally, such as being positioned in, on, and/or near the same structure.

In some embodiments, control panel 105-*b* may receive one or more data signals communicated from first device 115-*d*. Based at least in part on receiving one or more data signals, one or more operations may be performed by control panel 105-*b*, and in some cases, at least some of the one or more operations may be performed by proxy module 215-*d*. For example, a receive module of control panel 105-*b* may receive the one or more data signals from first device 115-*d*. The proxy module 215-*d* may then perform one or more operations based at least in part on the one or more received data signals and/or one or more received requests from one or more devices 115. These one or more operations may include, but are not limited to, modifying, transmitting, analyzing, identifying, and/or copying one or more characteristics and/or portions of the one or more data signals. In some embodiments, control panel 105-*b* may be proxy device.

In some embodiments, proxy module 215-*d* may be in communication with one or more other elements of control panel 105-*b*. These one or more other elements may include a receive module, a transmitter module, and/or a user interface, among others. In some embodiments, proxy module 215-*d* (or one or more other elements of control panel 105-*b*) may be in communication with one or more other components of communications system 600. These one or more other components may include one or more digital video recorders (DVRs) 115-*e*, user devices 115-*f*, alternate control panels 105-*c*, and/or others. In some embodiments, proxy module 215-*d* may be in communication with one or more other components and/or elements via one or more communication links, which may include wired and/or wireless connection. As shown in FIG. 6, these communication links may be of one or more different types, including 125 and/or 134, among others.

In some embodiments, proxy module 215-*d* may receive information from one or more components, including from one or more digital video recorders (DVRs) 115-*e*, user devices 115-*f*, alternate control panels 105-*c*, remote servers, among others. This received information may include one or more requests, notifications, updates, user selections, and/or system parameters, and/or performance parameters, etc. This request received by the proxy module 215-*d* may be generated by and/or transmitted from one or more digital video recorders (DVRs) 115-*e*, user devices 115-*f*, alternate control panels 105-*c*, remote servers, among others. For example, user device 115-*f* may transmit an information request directly to proxy module 215-*d* and/or user device 115-*f* may transmit an information request through a remote server using a wired and/or a wireless connection to proxy module 215-*d*. In some embodiments, the one or more requests, notifications, updates, user selections, and/or system parameters, and/or performance parameters, etc. may relate to one or more data signals related to the requesting device 115 and/or one or more other devices 115. For example, user device 115-*f* may request one or more data signals relating to one or more other devices, such as first device 115-*d* and/or digital video recorder 115-*e*, from proxy module 215-*d*.

In some embodiments, control panel 105-*b* may receive one or more data signals from first device 115-*d*. In some embodiments, the received data signals from first device 115-*d* may include a single transmission. This single transmission may include one or more data signals specific to the first device 115-*d*. In some cases, this single transmission may be the only data signal outputted from first device 115-*d* during a given time period and/or at all. In some embodiments, the single transmission includes the only output transmission by the first device 115-*d*, meaning that the only data signal output from the first device may include the single transmission. In some embodiments, the single transmission may include one or more still images and/or video data signals.

Based at least in part on receiving the one or more requests, notifications, updates, user selections, and/or system parameters, and/or performance parameters, etc., proxy module 215-*d* and/or another element of control panel 105-*b* may modify one or more data signals. In some embodiments, modifying may include splicing two or more portions of one or more data signals together. For example, proxy module 215-*d* may splice two data signals that each originate from separate video cameras. Modifying may also include multiplexing two or more portions of one or more data signals. Modifying may also include re-encoding two or more portions of one or more data signals.

In some embodiments, modifying may include modifying at least one characteristic of at least one or more portions of one or more data signals. For example, proxy module 215-*d* may modify quality, resolution, hue, brightness, length, size, orientation, and/or other data signal characteristics. As an example, proxy module 215 may modify one or more data signals by modifying a first resolution of at least a portion of one or more data signals from the first resolution to a second resolution. This second resolution may be greater than, greater than or equal to, equal to, less than or equal to, or less than the first resolution. Examples of potential resolutions include, but are not limited to: 15360×8640, 10000×7000, 2K, 4K, 8K, 7680×4320, 4096×2160, 3840×2160, 2048×1080, 1998×1080, 1440×1080, 1280×720, 720×576, 720×480, 570×480, 480×360, etc. For example, the first resolution may be 1280×720 and the second resolution may be 720×480.

In some embodiments, proxy module 215-*d* may modify the one or more data signals based on parameters relating to communications system 600 itself, one or more requesting devices (e.g., digital video recorder 115-*e*, user device 115-*f*, alternate control panel 105-*c*, user interface 425*a*), communication links 125 and/or 134. Proxy module 215-*d* may modify the one or more data signals based on determining parameters related to one or more devices, components, and/or elements, including performance, system limitations, user requirements, user preferences, and/or system preferences, etc. For example, proxy module 215-*d* may transmit one or more modified data signals based on a display capability of a user device, such as a tablet computer.

As another example, proxy module 215 may modify one or more data signals by modifying a first format of at least a portion of one or more data signals from the first format to a second format. For example, this second format may be of a quality greater than, greater than or equal to, equal to, less than or equal to, or less than the first format.

Based at least in part on receiving one or more requests, notifications, updates, user selections, and/or system parameters, and/or performance parameters, etc., proxy module 215-*d* and/or another element of control panel 105-*b* may transmit one or more data signals to one or more components. For example, based on receiving a request from user device 115-*f*, proxy module 215-*d* (and/or another element of control panel 105-*b*) may transmit one or more data signals or some portion thereof to user device 115-*f* and/or alternate control panel 105-*c*, among others.

In some embodiments, proxy module 215-*d* may receive one or more data signals from a first device 115-*d* and may then copy and/or modify at least a portion of the one or more data signals. Then, proxy module 215-*d* may transmit one or more data signals to one or more other devices. For example, proxy module 215-*d* may transmit a first data signal having a first resolution (e.g., 2048×1080) to digital video recorder 115-*e* and a second data signal having a second resolution (e.g., 720×480) to user device 115-*f*.

As another example, proxy module 215-*d* may transmit a first data signal having a first resolution to user interface 425-*a*, a second data signal (or a modified variant of a first data signal) having a first resolution to digital video recorder 115-*e*, a third data signal (or a modified variant of a first data signal) having a first resolution to user device 115-*f*, and/or a fourth data signal (or a modified variant of a first data signal) having a first resolution to alternate control panel 105-*c*. These one or more transmissions may occur in series, in parallel, simultaneously, in a particular order, based at least in part on a user, a user device, a system limitation, and/or a system preference, based at least in part on communications system 600 and/or related requirements (including wireless system bandwidth usage parameters), etc.

In some embodiments, proxy module 215-*d* may transmit one or more data signals or some portion thereof without receiving one or more requests, notifications, updates, user selections, and/or system parameters, and/or performance parameters, etc. Instead, proxy module 215-*d* may transmit one or more data signals based on one or more other events, parameters, and/or characteristics, including but not limited to, receiving a data signal itself, automatically based on software programming, and/or a proxy-module originated event. Thus, the proxy module 215-*d* may not require input from another device to transmit one or more data signals.

Figure 7:
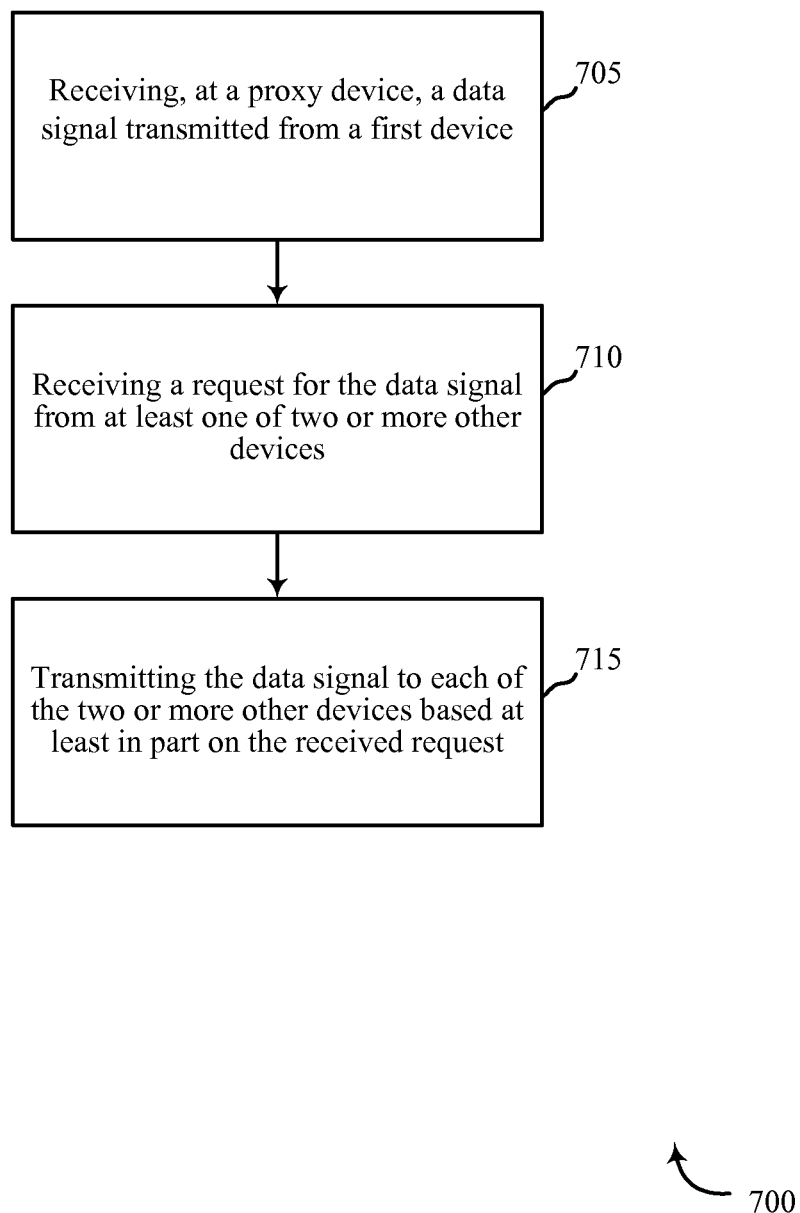
FIG. 7 is a flow chart illustrating examples of methods relating to a security and/or an automation system, in accordance with various aspects of this disclosure.

FIG. 7 is a flow chart illustrating examples of methods 700 relating to signal proxying, in accordance with various aspects of the present disclosure. For clarity, the method 700 is described below with reference to aspects of one or more of the features, modules, elements, and/or components described with reference to one or more of FIGS. 1-6. In some examples, a control panel may execute one or more sets of codes to control the functional elements of the control panel and/or other devices to perform the functions described below and throughout this disclosure. Additionally or alternatively, other devices such as devices 115 and/or a server such as remote server 145 may perform one or more of the functions described below using special-purpose hardware.

At block 705, the method 700 may include receiving, at a proxy device, a data signal transmitted from a first device. In some embodiments, this first device may be one or more components of a system, such as security and/or home automation device. At block 710, the method 700 may include receiving a request for the data signal from at least one of two or more other devices. At block 715, the method 700 may include transmitting the data signal to each of the two or more other devices based at least in part on the received request. The operation(s) at blocks 705-715 may be performed using the proxy module 215 described with reference to FIGS. 2-6, among other modules, elements, components, and/or devices.

Thus, the method 700 may provide for signal proxying relating to automation/security systems. It should be noted that the method 700 is just one implementation and that the operations of the method 700 may be rearranged or otherwise modified such that other implementations are possible.

Figure 8:
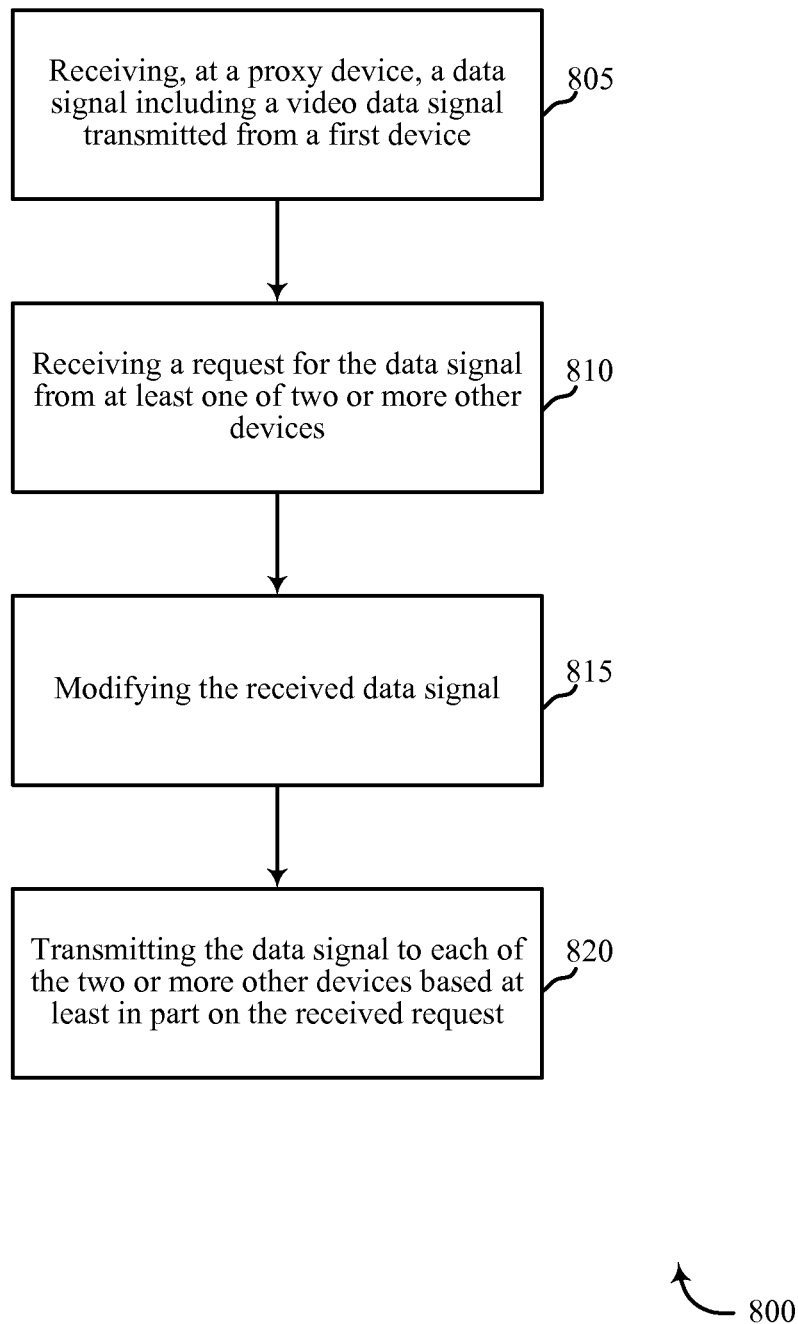
FIG. 8 is a flow chart illustrating examples of methods relating to a security and/or an automation system, in accordance with various aspects of this disclosure.

FIG. 8 is a flow chart illustrating examples of methods 800 relating to signal proxying and modification, in accordance with various aspects of the present disclosure. For clarity, the method 800 is described below with reference to aspects of one or more of the features, modules, elements, and/or components described with reference to one or more of FIGS. 1-6. In some examples, a control panel may execute one or more sets of codes to control the functional elements of the control panel and/or other devices to perform the functions described below and throughout this disclosure. Additionally or alternatively, other devices such as devices 115 and/or a server such as remote server 145 may perform one or more of the functions described below using special-purpose hardware.

At block 805, the method 800 may include receiving, at a proxy device, a data signal that may include a video data signal transmitted from a first device. At block 810, the method 800 may include receiving a request for the data signal from at least one of two or more other devices. At block 815, the method 800 may include modifying the received data signal. This modifying of one (or more) received data signals may include, but is not limited to, modify, transform, annotate, track, re-encode, and/or duplicate, etc. at least one portion of a data signal, among other things. At block 820, the method 800 may include transmitting the data signal to each of the two or more other devices based at least in part on the received request. The operation(s) at blocks 805-820 may be performed using the proxy module 215 described with reference to FIGS. 2-6, among other modules, elements, components, and/or devices.

Thus, the method 800 may provide for signal proxying and/or modification relating to automation/security systems. It should be noted that the method 800 is just one implementation and that the operations of the method 800 may be rearranged or otherwise modified such that other implementations are possible.

Figure 9:
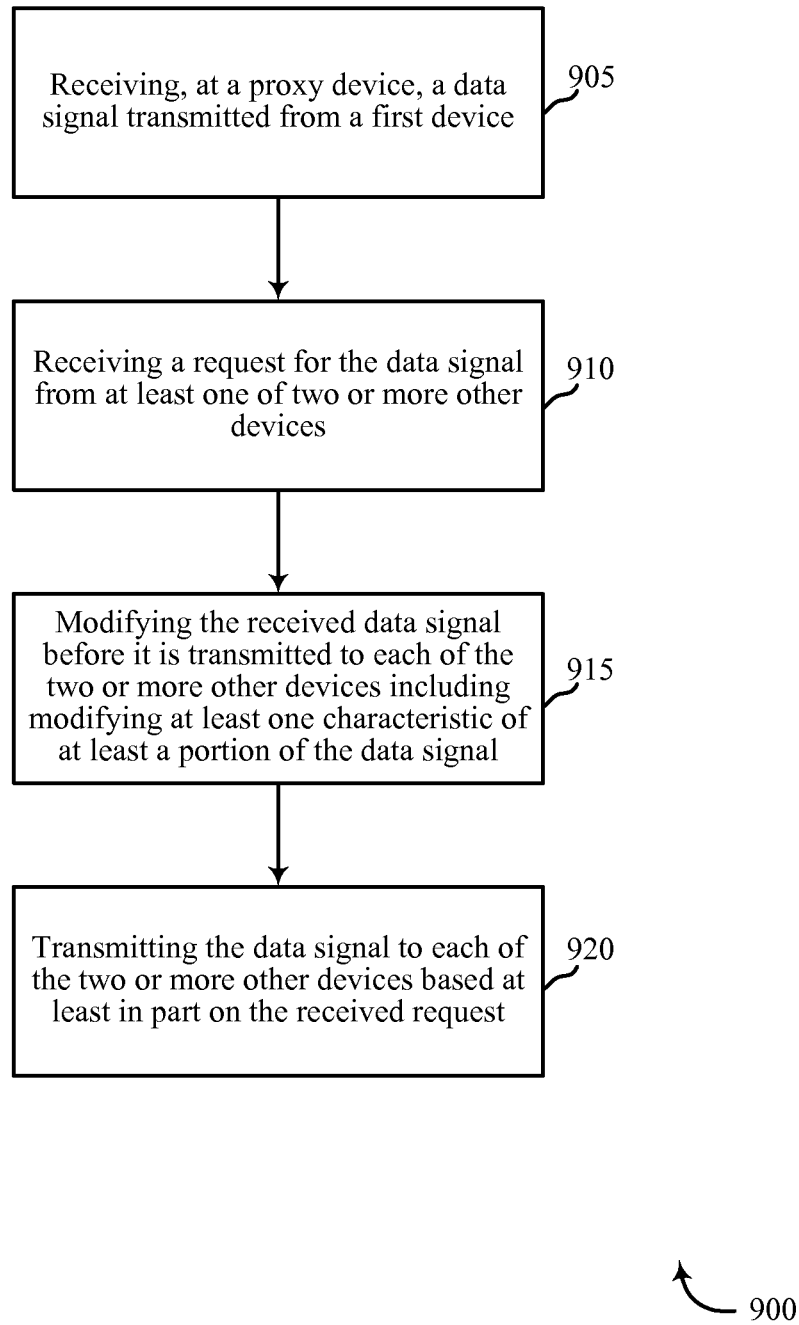
FIG. 9 is a flow chart illustrating examples of methods relating to a security and/or an automation system, in accordance with various aspects of this disclosure.

FIG. 9 is a flow chart illustrating examples of methods 900 relating to signal proxying and modification, in accordance with various aspects of the present disclosure. For clarity, the method 900 is described below with reference to aspects of one or more of the features, modules, elements, and/or components described with reference to one or more of FIGS. 1-6. In some examples, a control panel may execute one or more sets of codes to control the functional elements of the control panel and/or other devices to perform the functions described below and throughout this disclosure. Additionally or alternatively, other devices such as devices 115 and/or a server such as remote server 145 may perform one or more of the functions described below using special-purpose hardware.

At block 905, the method 900 may include receiving, at a proxy device, a data signal transmitted from a first device. At block 910, the method 900 may include receiving a request for the data signal from at least one of two or more other devices. At block 915, the method 900 may include modifying the received data signal before it is transmitted to each of the two or more other devices including modifying at least one characteristic of at least a portion of the data signal. At block 920, the method 900 may include transmitting the data signal to each of the two or more other devices based at least in part on the received request. The operation(s) at blocks 905-920 may be performed using the proxy module 215 described with reference to FIGS. 2-6, among other modules, elements, components, and/or devices.

Thus, the method 900 may provide for signal proxying and/or modification relating to automation/security systems. It should be noted that the method 900 is just one implementation and that the operations of the method 900 may be rearranged or otherwise modified such that other implementations are possible.

Figure 10:
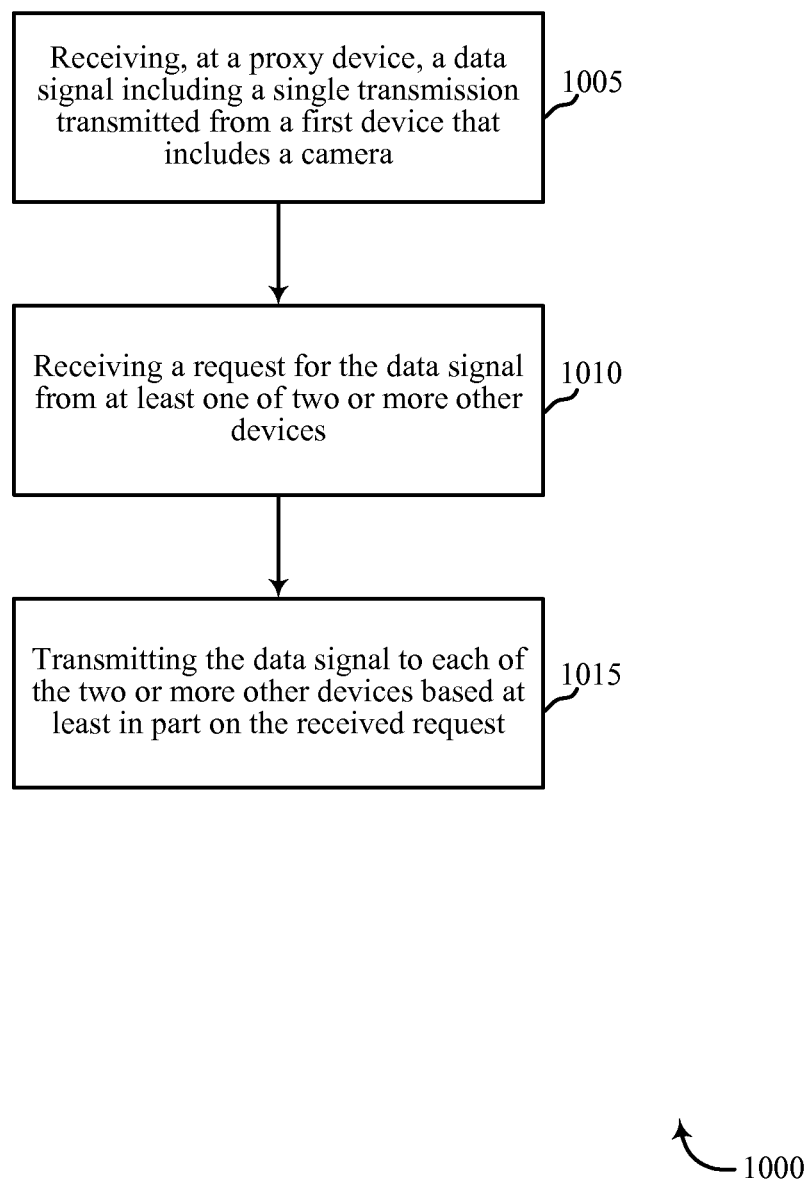
FIG. 10 is a flow chart illustrating examples of methods relating to a security and/or an automation system, in accordance with various aspects of this disclosure.

FIG. 10 is a flow chart illustrating examples of methods 1000 relating to signal proxying and modification, in accordance with various aspects of the present disclosure. For clarity, the method 1000 is described below with reference to aspects of one or more of the features, modules, elements, and/or components described with reference to one or more of FIGS. 1-6. In some examples, a control panel may execute one or more sets of codes to control the functional elements of the control panel and/or other devices to perform the functions described below and throughout this disclosure. Additionally or alternatively, other devices such as devices 115 and/or a server such as remote server 145 may perform one or more of the functions described below using special-purpose hardware.

At block 1005, the method 1000 may include receiving, at a proxy device, a data signal including a single transmission transmitted from a first device that includes a camera. At block 1010, the method 1000 may include receiving a request for the data signal from at least one of two or more other devices. At block 1015, the method 1000 may include transmitting the data signal to each of the two or more other devices based at least in part on the received request. The operation(s) at blocks 1005-1015 may be performed using the proxy module 215 described with reference to FIGS. 2-6, among other modules, elements, components, and/or devices.

Thus, the method 1000 may provide for signal proxying relating to automation/security systems. It should be noted that the method 1000 is just one implementation and that the operations of the method 1000 may be rearranged or otherwise modified such that other implementations are possible.

Figure 11:
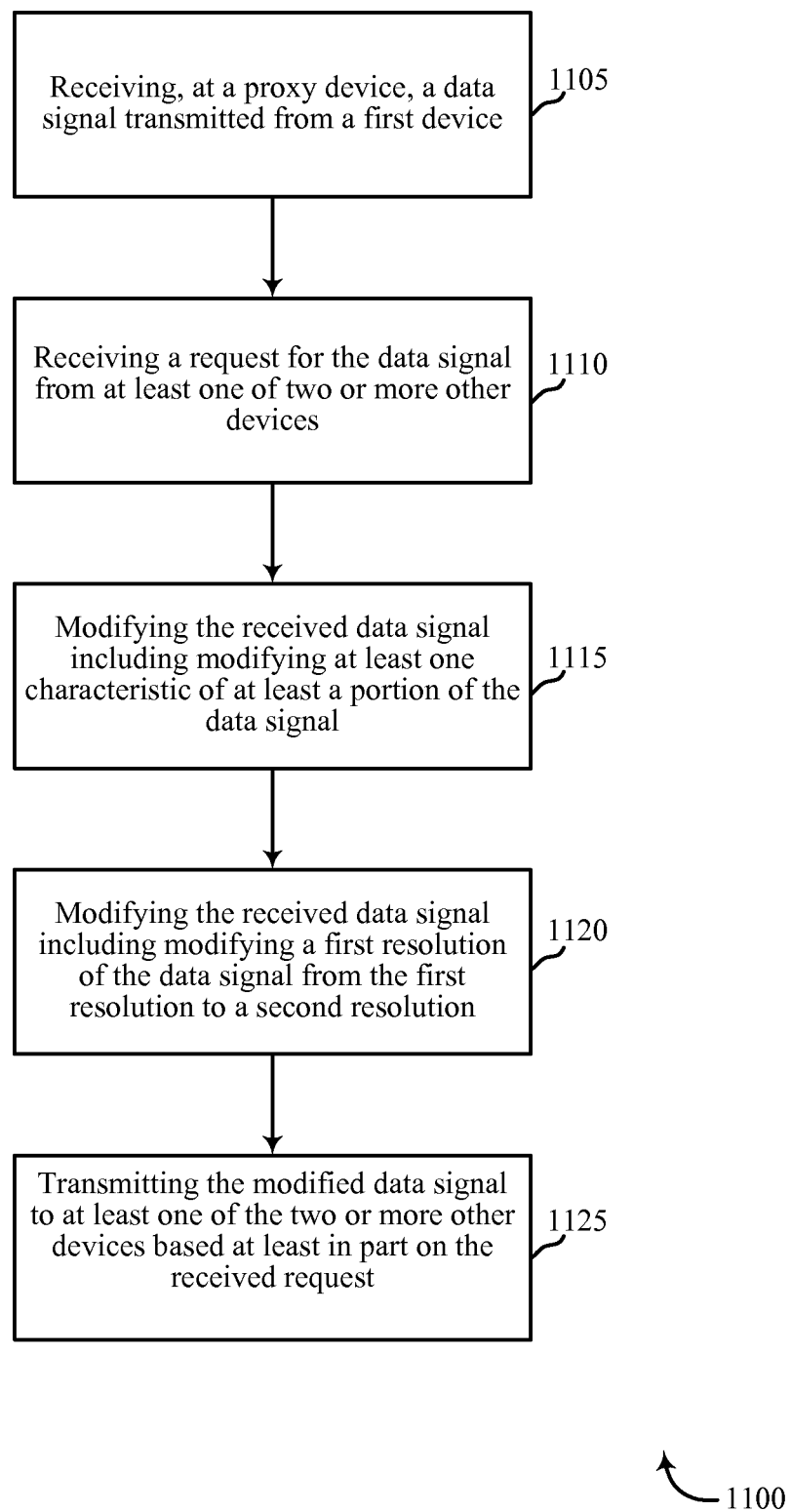
FIG. 11 is a flow chart illustrating examples of methods relating to a security and/or an automation system, in accordance with various aspects of this disclosure.

FIG. 11 is a flow chart illustrating examples of methods 1100 relating to signal proxying and modification, in accordance with various aspects of the present disclosure. For clarity, the method 1100 is described below with reference to aspects of one or more of the features, modules, elements, and/or components described with reference to one or more of FIGS. 1-6. In some examples, a control panel may execute one or more sets of codes to control the functional elements of the control panel and/or other devices to perform the functions described below and throughout this disclosure. Additionally or alternatively, other devices such as devices 115 and/or a server such as remote server 145 may perform one or more of the functions described below using special-purpose hardware.

At block 1105, the method 1100 may include receiving, at a proxy device, a data signal that may include a video data signal transmitted from a first device. At block 1110, the method 1100 may include receiving a request for the data signal from at least one of two or more other devices. At block 1115, the method 1100 may include modifying the received data signal including modifying at least one characteristic of at least a portion of the data signal. At block 1120, the method 1100 may include modifying the received data signal including modifying a first resolution of the data signal from the first resolution to a second resolution. At block 1125, the method 1100 may include transmitting the modified data signal to at least one of the two or more other devices based at least in part on the received request. The operation(s) at blocks 1105-1125 may be performed using the proxy module 215 described with reference to FIGS. 2-6, among other modules, elements, components, and/or devices.

Thus, the method 1100 may provide for signal proxying and/or modification relating to automation/security systems. It should be noted that the method 1100 is just one implementation and that the operations of the method 1100 may be rearranged or otherwise modified such that other implementations are possible.

In some examples, aspects from two or more of the methods 700-1100 may be combined, omitted, and/or separated. It should be noted that the methods 700, 800, 900, 1000, 1100, etc. are just example implementations, and that the operations of the methods 700-1100 may be rearranged and/or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
   receiving, at a proxy device via one or more antennas, a video data signal recorded at a camera of the security and/or automation system, wherein the proxy device is included in a control panel of a set of control panels associated with the security and/or automation system, wherein the proxy device serves at least a first device and a second device that are located within a geographic coverage area via the one or more antennas, and wherein the set of control panels are in communication with each other;
   receiving, at the proxy device via the one or more antennas, a request for the video data signal from the first device;
   modifying, by the proxy device, a resolution of the video data signal from a first resolution to a second resolution based on a user preference related to the first device, wherein the modifying further comprises annotating the video data signal based at least in part on the request for the video data signal;
   transmitting, by the proxy device via the one or more antennas on behalf of the first device, the video data signal having the first resolution to the first device and the modified video data signal having the second resolution to the second device based at least in part on the received request from the first device; and
   outputting an interface element related to the video data signal at a user interface module of the control panel.

2. The method of claim 1, further comprising:
   modifying the video data signal by tracking the video data signal based at least in part on the request for the video data signal.

3. The method of claim 1, wherein the camera is located within a structure covered by the security and/or automation system, the method further comprising:
   modifying a quality of the video data signal to create the modified video data signal.

4. The method of claim 1, wherein the received data signal comprises:
   a single transmission from the first device.

5. The method of claim 1, wherein the second device comprises:

one of a digital video recorder, or a smartphone, or a laptop.

6. The method of claim 1, further comprising:
communicating with the second device on behalf of the first device.

7. The method of claim 1, wherein the data signal is received from the first device via a wireless connection.

8. The method of claim 1, further comprising:
modifying the video data signal by splicing the data signal.

9. The method of claim 1, further comprising:
modifying the video data signal by re-encoding the data signal.

10. The method of claim 1, further comprising:
modifying at least one characteristic of at least a portion of the data signal.

11. The method of claim 1, wherein the first resolution is greater than the second resolution.

12. The method of claim 1, further comprising:
requesting, from the proxy device, an alternate control panel of the security and/or automation system to transmit the video data signal captured by the camera to the proxy device, wherein the alternate control panel is directly wired to the camera.

13. The method of claim 1, wherein modifying the video data signal further comprises:
splicing together a first portion and a second portion of the video data signal.

14. The method of claim 1, wherein modifying the video data signal further comprises:
splicing together at least a portion of the video data signal and at least a portion of a second video data signal.

15. The method of claim 1, further comprising:
modifying the video data signal by at least one of re-encoding the video data signal based at least in part on the request for the video data signal.

16. An apparatus for security and/or automation systems, comprising:
a processor;
memory in electronic communication with the processor; and
instructions stored in the memory, the instructions being executable by the processor to:
receive, at a proxy device via one or more antennas, a video data signal recorded at a camera of the security and/or automation system, wherein the proxy device is included in a control panel of a set of control panels associated with the security and/or automation system, wherein the proxy device serves at least a first device and a second device that are located within a geographic coverage area via the one or more antennas, and wherein the set of control panels are in communication with each other;
receive, at the proxy device via the one or more antennas, a request for the video data signal from the first device;

modify, by the proxy device, a resolution of the video data signal from a first resolution to a second resolution based on a user preference related to the first device, wherein the modifying further comprises annotating the video data signal based at least in part on the request for the video data signal;
transmit, by the proxy device via the one or more antennas on behalf of the first device, the video data signal having the first resolution to the first device and the modified video data signal having the second resolution to the second device based at least in part on the received request from the first device; and
output an interface element related to the video data signal.

17. The apparatus of claim 16, the instructions further being executable by the processor to:
transcode the video data signal before it is transmitted to the first device; and
transcode the modified video data signal before it is transmitted to the second device.

18. The apparatus of claim 16, the instructions further being executable by the processor to:
modify the video data signal by tracking the video data signal based at least in part on the request for the video data signal.

19. A non-transitory computer-readable medium storing computer-executable code for security and/or automation systems, the code executable by a processor to:
receive, at a proxy device via one or more antennas, a video data signal recorded at a camera of the security and/or automation system, wherein the proxy device is included in a control panel of a set of control panels associated with the security and/or automation system, wherein the proxy device serves at least a first device and a second device that are located within a geographic coverage area via the one or more antennas, and wherein the set of control panels are in communication with each other;
receive, at the proxy device via the one or more antennas, a request for the video data signal from the first device;
modify, by the proxy device, a resolution of the video data signal from a first resolution to a second resolution based on a user preference related to the first device, wherein the modifying further comprises annotating the video data signal based at least in part on the request for the video data signal;
transmit, by the proxy device via the one or more antennas on behalf of the first device, the video data signal having the first resolution to the first device and the modified video data signal having the second resolution to the second device based at least in part on the received request from the first device; and
output an interface element related to the video data signal at a user interface module of the control panel.

* * * * *